(12) United States Patent
Iyengar et al.

(10) Patent No.: US 8,910,189 B2
(45) Date of Patent: Dec. 9, 2014

(54) METHODS AND SYSTEMS FOR AUTOMATICALLY DETERMINING CONFIGURATION PARAMETERS

(75) Inventors: Arun Kwangil Iyengar, Yorktown Heights, NY (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1957 days.

(21) Appl. No.: 11/680,000

(22) Filed: Feb. 28, 2007

(65) Prior Publication Data

US 2008/0209445 A1 Aug. 28, 2008

(51) Int. Cl.
| | |
|---|---|
| *G06F 3/00* | (2006.01) |
| *G06F 9/44* | (2006.01) |
| *G06F 9/45* | (2006.01) |
| *G06F 9/46* | (2006.01) |
| *G06F 13/00* | (2006.01) |
| *G06F 9/445* | (2006.01) |

(52) U.S. Cl.
CPC .................................. *G06F 9/44505* (2013.01)
USPC .......................................... 719/320; 717/131

(58) Field of Classification Search
CPC ............ G06F 9/44505; G06F 11/3466; G06F 11/3495
See application file for complete search history.

(56) References Cited

U.S. PATENT DOCUMENTS

2005/0207439 A1   9/2005   Iyengar et al.

FOREIGN PATENT DOCUMENTS

CN   1588316 A   3/2005

OTHER PUBLICATIONS

Bianca Schroeder, et al.; How to Determine a Good Multi-Programming Level for External Scheduling; Apr. 2006; Proceedings of the 22nd International Conference on Data Engineering; 12 pages.*
Gerhard Weikum, et al.; Self-tuning database technology and information services: from wishful thinking to viable engineering; Proceedings of the 28th international conference on Very Large Data Bases; Aug. 2002; 12 pages.*
Rahm, Erhard; Goal-oriented performance control for transaction processing; 1997; 16 pages.*
SQL Anywhere® Server Database Administration; Sybase; iAnywhere Solutions; Oct. 2006; 3 pages (excerpt).*
B. Xi et al, "A Smart Hill-Climbing Algorithm for Application Server Configuration," WWW, May 2004, pp. 287-296, New York.
"Configuration Parametsrs Summary," IBM DB2, http://publib.boulder.ibm.com/infocenter/db2luw/v8/index.jsp?topic=/ com.ibm.db2.udb.doc/admin/r0005181.htm, 18 pages, accessed Mar. 2, 2007.
"Websphere MQ Configuration Parameters," http://publib.boulder.ibm.com/infocenter/db2luw/v9/index.jsp?topic=/com.ibm.websphere.ii.db2udb.foundation.appdev.fed.mq.doc/configuring/iiynafmqamiconfigobj.html, 4 pages, accessed Mar. 2, 2007.

* cited by examiner

*Primary Examiner* — Andy Ho
*Assistant Examiner* — Kimberly Jordan
(74) *Attorney, Agent, or Firm* — Preston J. Young; Ryan, Mason & Lewis, LLP (57) ABSTRACT

Techniques are disclosed for automatically determining one or more configuration parameters associated with one or more programs executable by a computing system. For example, in a system including at least one application and at least one parameter which affects a behavior of the at least one application, a method for determining a frequency for invoking the at least one application includes the following steps. The method estimates a cost which includes overhead resulting from invoking the at least one application. The method estimates an improvement in the behavior resulting from modifying the at least one parameter based on invoking the at least one application. The method selects the frequency based on the cost and the improvement.

21 Claims, 4 Drawing Sheets

METHODS AND SYSTEMS FOR AUTOMATICALLY DETERMINING CONFIGURATION PARAMETERS

FIELD OF THE INVENTION

The present invention generally relates to computing systems and programs executed therein, more particularly, to techniques for automatically determining one or more configuration parameters associated with one or more programs executable by a computing system.

BACKGROUND OF THE INVENTION

Configuring parameters for computer programs (e.g., applications executed by one or more servers) is essential for enabling the programs to run correctly and efficiently. Many programs have configuration parameters, which are specified at run time. Requiring users to specify a long set of configuration parameters complicates the task of the user. It increases the amount of work the user must do. The user may not know what values to choose and may spend considerable extra time configuring the program.

It may also not be possible for the program manufacturer to choose default values that will consistently result in good performance, since performance may be highly dependent on a specific deployment and may also change over time in response to changing workloads presented to the computing system.

In the article by Xi et al., "A Smart Hill-Climbing Algorithm for Application Server Configuration," Proceedings of WWW2004, p. 287, 2004, a method is described for determining server configuration parameters. However, among other deficiencies, the Xi et al. approach does not address the problem of the large processing overhead associated with testing out different configuration parameters. Further, the Xi et al. approach does not address the problem of optimizing configuration parameters across multiple applications.

There is thus a need for improved systems and methods for automatically determining configuration parameter values.

SUMMARY OF THE INVENTION

Principles of the present invention provide techniques for automatically determining one or more configuration parameters associated with one or more programs executable by a computing system.

For example, in a system including at least one application and at least one parameter which affects a behavior of the at least one application, one aspect of the invention includes a method for determining a frequency for invoking the at least one application. The method estimates a cost which includes overhead resulting from invoking the at least one application. The method estimates an improvement in the behavior resulting from modifying the at least one parameter based on invoking the at least one application. The method selects the frequency based on the cost and the improvement.

The method may further include the step of invoking the at least one application with the frequency to modify the at least one parameter in order to improve the behavior. The behavior may include at least one of performance, availability, minimization of exposure to lost data, accuracy, and consistency.

Further, the method may include the step of modifying the frequency based on a change in workload. The behavior may include performance and the selecting step may include selecting the frequency based on a difference of the improvement and the cost. For example, the frequency that maximizes a difference of the improvement and the cost may be selected.

Still further, the method may include the steps of identifying at least one invocation of an application that might change application state, and preserving at least one original value of the application state using one of checkpointing and copy-on-write.

In a system including a plurality of applications in which a behavior of the applications is affected by at least one parameter, another aspect of the invention includes a method for determining a frequency for invoking an application. The method determines the frequency based on at least one of an overhead for invoking the application, an expected improvement in the behavior from invoking the application, a proportion of total system workload consumed by the application, and a proportion of total system behavior which the application results in.

The method may further include the step of invoking the application with the frequency to modify the at least one parameter in order to improve the behavior.

In a system including a plurality of applications in which a behavior of the applications is affected by at least one parameter, yet another aspect of the invention includes a method for grouping the applications. The method groups the applications into at least one set wherein applications belonging to a same set have similar behavior as a function of the at least one parameter.

The method may further include the step of using the at least one set to reduce the number of applications invoked. A single application from each set of the at least one set may be invoked.

In a system including at least one application and at least one parameter that affects performance of the at least one application, a further aspect of the invention includes a method for determining a frequency for invoking the at least one application. The method provides a first function for estimating a cost which includes overhead resulting from invoking the at least one application, wherein the cost is dependent on a frequency of invoking the application. The method provides a second function for estimating performance improvement resulting from modifying the at least one parameter based on invoking the at least one application with said frequency. The method selects a frequency based on a difference of the second and first function. The first function may be a constant multiplied by the frequency.

Advantageously, principles of the invention provide new features for minimizing overhead in testing out different configuration parameters. Principles of the invention also address the problem of optimizing configuration parameters across multiple applications.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary client-server computing environment. It should be understood, however, that the invention is not limited to use with such a particular environment. The invention is instead more generally applicable to any data processing or computing environment in which it would be desirable to automatically determine one or more configuration parameters associated with one or more programs executable by a computing system.

As used herein, the phrase "computing system" may refer to a single computing device (or processor) or multiple computing devices (or processors). In a multiple computing device environment, the computing system may include multiple servers that receive workload requests from remote clients.

Accordingly, principles of the invention provide methodologies for automatically determining configuration parameters. These methodologies can improve the performance of systems and simplify the configuration process.

Examples of configuration parameters include but are not limited to the following:

(i) Amount of memory and/or disk space to use for a cache.

(ii) In a client-server system in which a server satisfies requests with multiple processes or multiple threads, it is sometimes desirable to pre-fork a certain number of processes and/or threads for handling requests. The number of pre-forked processes and/or threads may be a configuration parameter.

(ii) In a database application, transactions may be periodically committed to the database. Commit operations are relatively expensive. However, before a commit happens, it is possible to lose data that has not yet been committed. The frequency of a commit operation can be varied via a configuration parameter. More frequent commits mean less data will be lost in the event of a failure. However, more frequent commits also result in more overhead.

In varying configuration parameters, we seek to optimize performance and/or other system behavior. In some cases, changing a configuration parameter will affect multiple aspects of the system. In these situations, we try to achieve the correct balance between the various aspects of the system (e.g., performance, availability, minimizing exposure to lost data).

Figure 1:
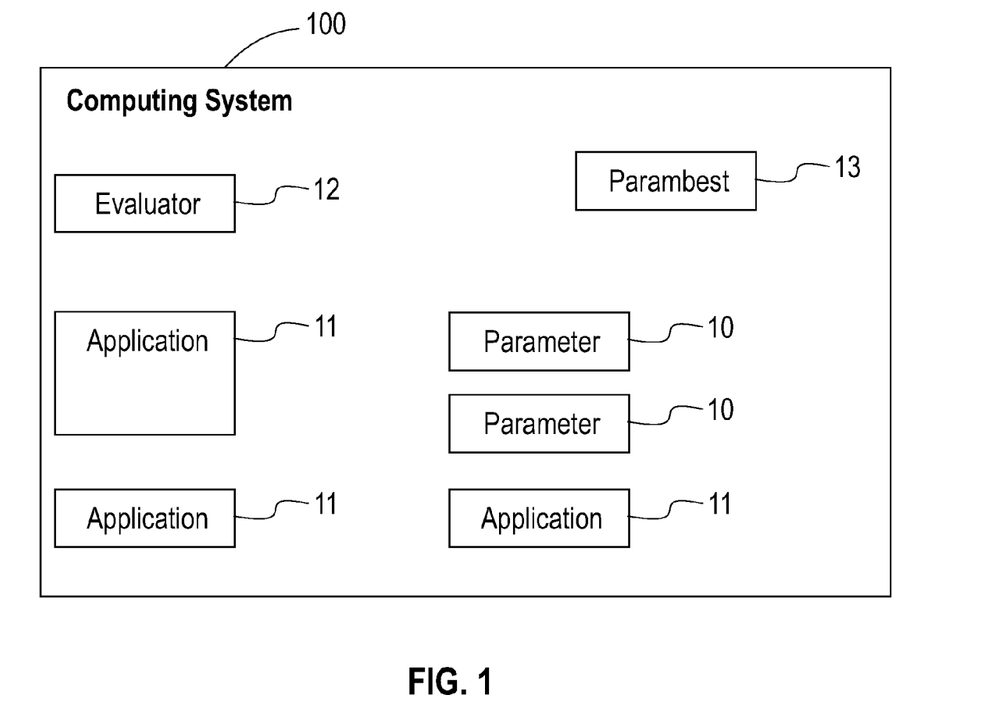
FIG. 1 depicts a computing system in accordance with an embodiment of the present invention.

FIG. 1 shows a computing system 100 in accordance with an embodiment of the invention. One or more applications 11 run on computing system 100. In one embodiment, the computing system 100 represents one or more application servers.

One or more parameters 10 (which are also synonymously referred to herein as "configuration parameters") may be adjusted so that characteristics of the applications 11 (e.g., performance) are optimized. The evaluator 12 has the ability to test out how well computing system 100 behaves with respect to the value(s) of one or more parameters 10. The configuration parameters might affect multiple aspects of system behavior such as performance, availability, accuracy, minimizing exposure to lost data, accuracy, consistency etc.

As an example, consider an application 11 which frequently needs data having at least one of the following characteristics:

(i) The data are remote and must be accessed over a network.

(ii) The data are stored on disk.

(iii) The data consume considerable central processing unit (CPU) cycles to generate.

In order to reduce the overhead for obtaining the data, the application 11 caches some of the data locally in its memory so that repeated requests for the data can be satisfied from the cache. This means that the computing system 100 allocates space in memory for the cache. The amount of space reserved for caching can be a configuration parameter 10. If not enough space is used for the cache, then the overhead for the application 11 may be high. On the other hand, if too much space is used for the cache, then performance of other parts of the system might suffer. Therefore, setting a value for cache size that results in near optimal performance is desirable.

The evaluator 12 determines the performance of the computing system 100 under different values of cache size. It performs similar determinations for other parameters that might affect the behavior of the system. The system maintains a set of parameters, parambest 13, which are the best estimates at the current time of values to use for configuration parameters. The evaluator 12 may update parambest 13 if it detects a parameter setting that improves performance over the current values.

Figure 2:
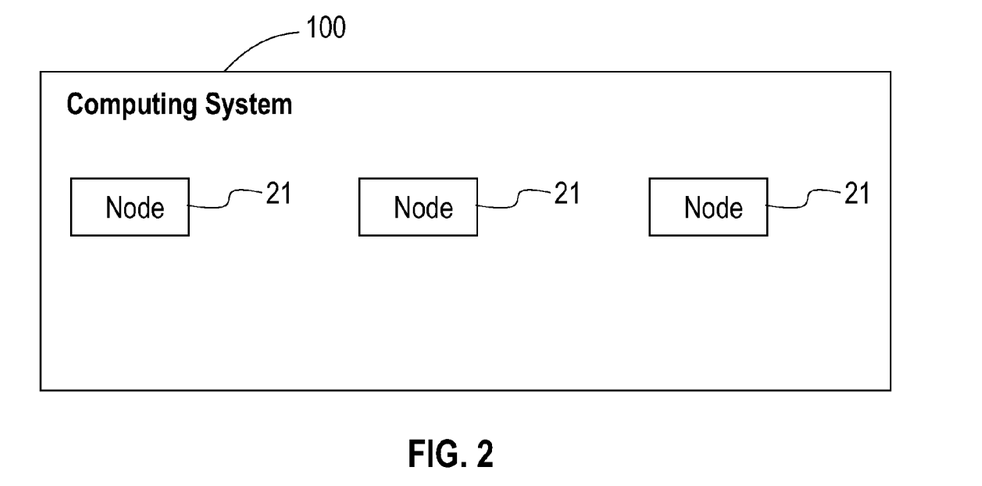
FIG. 2 depicts another view of a computing system in accordance with an embodiment of the present invention.

FIG. 2 depicts another view of computing system 100. The computing system may include a single node 21 or a plurality of nodes. A node 21 would typically represent a single computer (e.g., a single processor, multicore processor, symmetric multiprocessor, etc.). A node may include peripherals and/or persistent storage (e.g., disk storage, compact disc storage, tape storage, etc.).

The evaluator 12 might evaluate the behavior of a system using metrics including but not limited to CPU utilization, input/output (I/O) bandwidth consumption, a metric combining CPU utilization and I/O bandwidth, etc. There are several ways in which the parameters may be varied. Here are some of illustrative possibilities:

(i) For a single x parameter that takes on integer values between a certain range, test the values first in coarse granularity and then continuously refine to finer granularity. A binary search on the set of values could be used.

(ii) Use more sophisticated techniques to test out a range of different values.

(iii) The system may have to configure multiple parameters concurrently. In some cases, it will be possible to determine the optimal value of a parameter independently from the values of other parameters. In other cases, the optimal value of a parameter might be dependent on the value of other parameters; in these situations, the values of multiple parameters can be varied at the same time.

Figure 3:
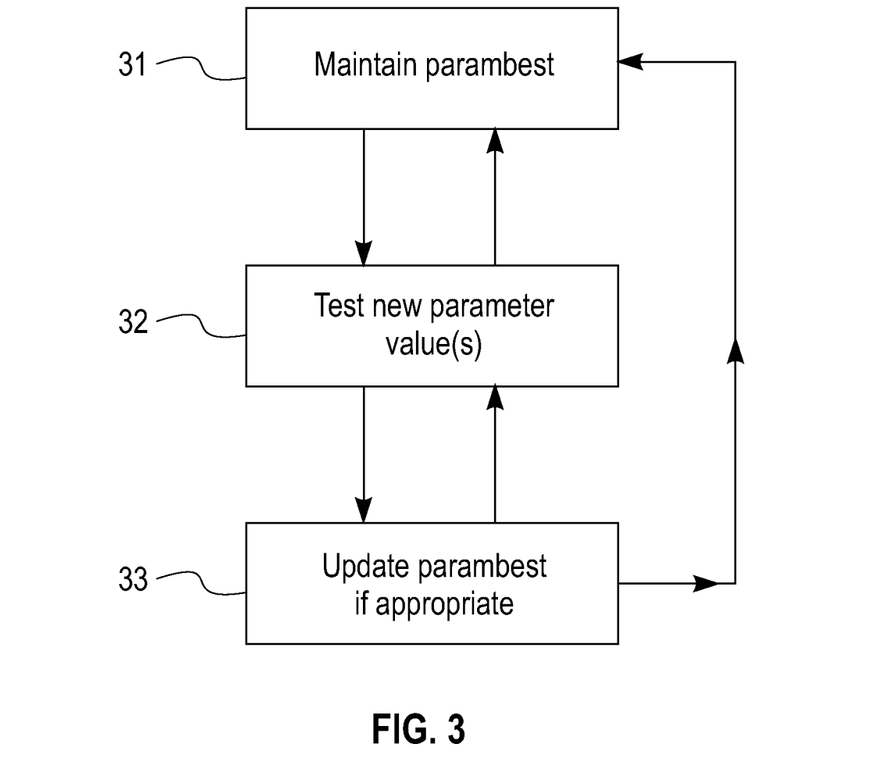
FIG. 3 depicts a method for maintaining and updating a set of configuration parameters in accordance with an embodiment of the present invention.

FIG. 3 depicts a method for configuring parameters in accordance with an embodiment of the invention. In step 31, the computing system 100 maintains parambest 13, i.e., the best set of configuration parameters 10 known at the current time.

In step 32, the system tests out new configuration parameters 10.

In step 33, parambest 13 is updated if appropriate.

Testing out different parameter values (step 32) may have high overhead. Therefore, the system will often need to limit the frequency with which it tests out different parameter values. There are a number of ways of doing this, including but not limited to the following:

(i) The system does not have to invoke an application 11 for the sole purpose of testing out different parameter values 10. Instead, the application 11 is being invoked frequently enough through normal operation of the computing system 100. Normal invocations of the application 11 would use the best known parameter values, parambest 13. However, every so often, the system will experiment with a new set of parameter values to see if it can improve behavior.

(ii) The system does not invoke an application 11 for the sole purpose of testing out different parameter values 10 unless the load on the system falls below a certain level. At this stage, the evaluator 12 tests out different parameter values to see if it can further improve behavior. Using this approach, the system only attempts reconfiguration when sufficient resources exist to do so without adversely affecting the performance of real applications currently executing on the system.

Figure 4:
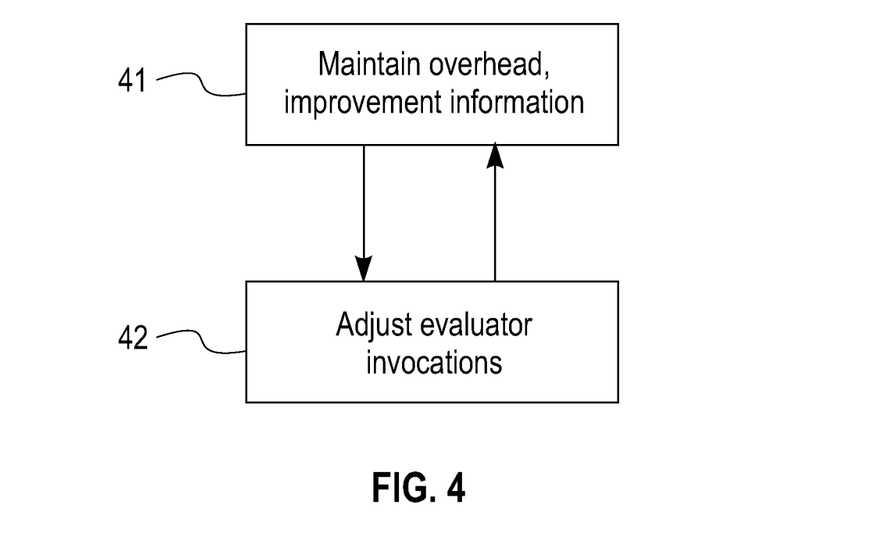
FIG. 4 depicts a method for determining frequencies for invoking applications to improve configuration parameters in accordance with an embodiment of the present invention.

Invoking an application 11 by the evaluator 12 can result in future benefits in behavior due to better configuration parameters 11. On the negative side, these invocations can result in greater system overhead. The frequency with which an application is invoked by the evaluator should therefore be chosen in order to best balance these competing factors. FIG. 4 depicts a method for properly selecting how frequently the evaluator 12 should invoke an application 11 to search for better configuration parameters 10.

In step 41, the system keeps track of recent overheads for testing out different parameters as well as how much system behavior has been improving in response to better parambest 13 values. It uses this information in step 42 to adjust the frequency with which the evaluator 12 invokes an application.

If behavior improves significantly with invocations of the application due to better configuration parameters, then this may lead to more frequent invocations of the application by the evaluator. If, on the other hand, behavior does not change much and invocations of the application by the evaluator consume considerable overhead, then this may lead to very infrequent invocations of the application by the evaluator. When a stage of diminishing returns is achieved such that behavior is not improving much despite considerable overhead for testing out different parameters, then the system may stop trying to optimize parameters until a change in the workload or system configuration would suggest that it may be profitable to try to reconfigure parameters again.

For example, suppose that the configuration parameters are being varied to optimize performance. Initially, invocations of the application result in improved configuration parameters that improve performance by on average of 5%. Then invocations of the application would be frequent. Over time, assume that less improvements are achieved by invoking the application. As the improvements drop, the application is invoked less frequently to optimize configuration parameters. The frequency for invoking the application is adjusted in step 42.

We now give another example in which one or more configuration parameters are being varied to optimize performance. In step 41, the system has an estimate of the overhead for invoking an application (based on past invocations) o and the expected savings s (also estimated from past invocations) that invoking the application an additional time would incur due to a more optimal choice of configuration parameters. When s is large relative to o, this argues for additional invocations of the evaluator. During periods of low system workload, the evaluator can also be more frequently invoked.

During periods of high workload, the system can use the following methodology for determining how frequently to invoke an application to improve configuration parameters. Let f(n) be the expected overhead if the application is invoked n times per time unit; f(n) includes the overhead for changing parameters, invoking the application, measuring system performance, and storing the relevant data from the new invocation. In many cases, f(n) will be proportional to n; f(n) could be c multiplied by n for some constant c. Let g(n) be the expected savings (because of better configuration parameters) resulting from invoking the application n times per time unit. In step 42, the system picks the value of n that maximizes:

$$g(n)-f(n)$$

and invokes the application n times per unit time.

Configuration parameters can be adjusted at run time while the application(s) is running. Alternatively, the configuration parameters can be adjusted in an offline fashion. In the case that parameter changes require restarting of an application, the online testing may be infeasible unless we can accept the service interruptions and overhead.

Moreover, some application invocations can change the state of the system. If such state changes are problematic, the system can create a checkpoint before the application invocation. After the invocation, the system can restore the system state using the previously saved checkpoint. This process can be optimized further with copy-on-write. With copy-on-write, the system can retain two copies of the system state, one of them only containing the original state. Therefore, restoring the checkpoint only involves discarding the copy of the system state affected by the application invocation for configuration estimation.

In several scenarios, there may be multiple applications 10 executing on a computing system 100, and the impact of varying one or more configuration parameters may not be the same across different applications.

For example, computing system 100 may include a set of software systems that is divided into multiple layers, e.g., an e-commerce system with a web server and an application server running on the same node 21. Both the web server and the application server run above the same operating system such as Linux. The setting of the parameters of the operating system can affect the performance of both the web server and the application server. Thus, when the system decides on a parameter setting of one piece of software, the interaction with other pieces of software should be considered as well.

Now consider a situation where n applications 11 for some integer n>1 are executing. In some cases, multiple applications may include situations where a single program is being invoked with different inputs, and the different inputs result in different performance characteristics as a function of configuration parameters. In periods of low workloads, the evaluator 12 can invoke all n applications multiple times to determine a good set of configuration parameters across the entire workload. A problem with this approach is that invoking a large number of applications can be expensive. Therefore, in periods of high workloads, it may be preferable to invoke only a small number of representative applications. Applications that only contribute to a disproportionately small fraction of system behavior do not have to be invoked as frequently.

Figure 5:
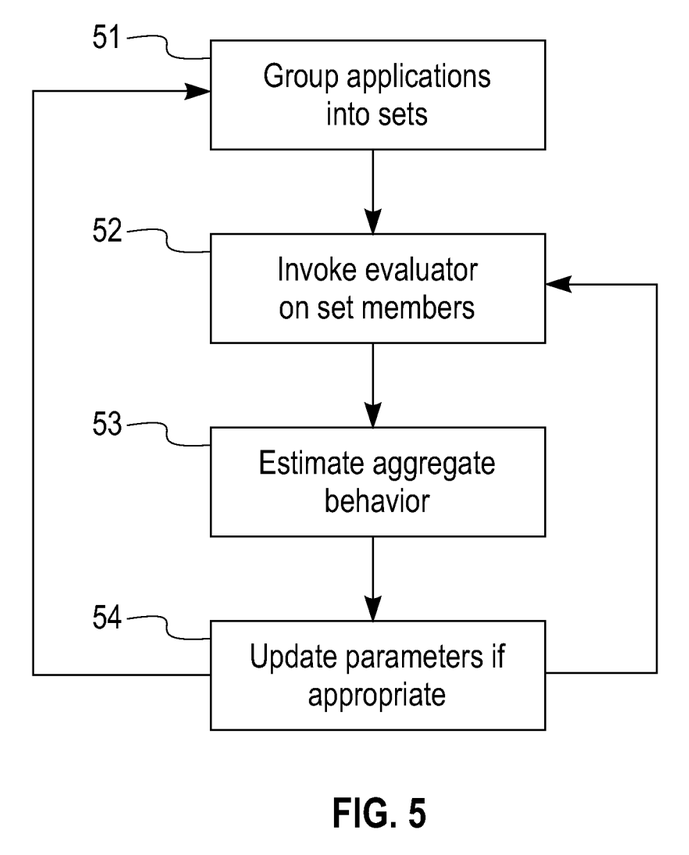
FIG. 5 depicts a method for optimizing configuration parameters across multiple applications in accordance with an embodiment of the present invention.

FIG. 5 depicts a method for estimating configuration parameters across multiple applications. The system maintains correlations between behaviors for different applications. Note that if the goal is to optimize performance via configuration parameters, the behavior could be the overhead consumed by an application.

In step 51, the system groups applications into sets s1, s2, . . . , sn such that two applications belonging to a same set have similar trends in behavior as a function of configuration parameters.

In step 52, the evaluator 12 invokes selected applications on a set of configuration parameters 10 and determines the behavior resulting from each invocation. A preferred method for doing this is to choose a set of configuration parameters 10 and invoke only one application from each of the sets determined in step 51. If the average set size is considerably larger than one, this should incur significantly less overhead than invoking every application.

In step 52, the evaluator 12 can give preference to invoking an application that contributes to more of the aggregate behavior of the entire system than other applications belonging to the same set. The evaluator can also give preference to invoking an application that consumes less overhead than other applications belonging to the same set.

In step 53, the system estimates the aggregate behavior for the entire workload from the information obtained in step 52.

In step 54, if the configuration parameters used for invoking applications in step 52 result in better aggregate behavior than the aggregate behavior resulting from parambest 13, then parambest 13 is updated with the new set of configuration parameters.

Figure 6:
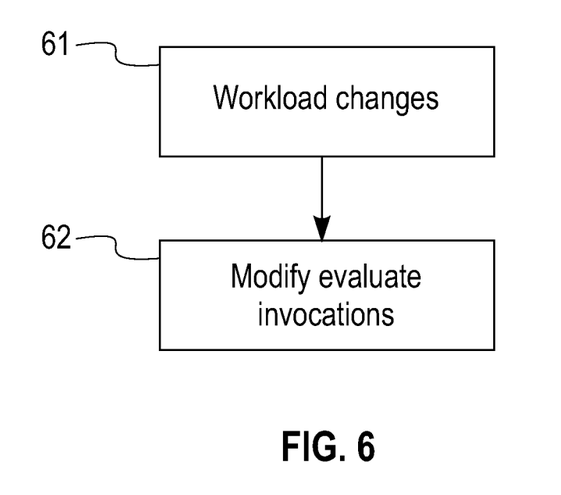
FIG. 6 depicts a method for modifying frequencies and/or methods for invoking applications to improve configuration parameters in response to a workload change in accordance with an embodiment of the present invention.

The system may modify the frequency and/or method it uses to optimize configuration parameters if the workload changes. This is depicted in FIG. 6.

In step 61, the workload changes. There are multiple types of workload changes that could occur. For example, an application may either be added, deleted, or the relative mix of applications may change.

In step 62, the frequencies for invoking one or more applications and/or the methods for invoking one or more applications are modified. The manner in which they are modified may correspond to the previous methods described above.

If the workload change is the addition of a new application, the evaluator 12 may invoke the new application more frequently than other applications in order to determine how its behavior varies as a function of configuration parameters.

Figure 7:
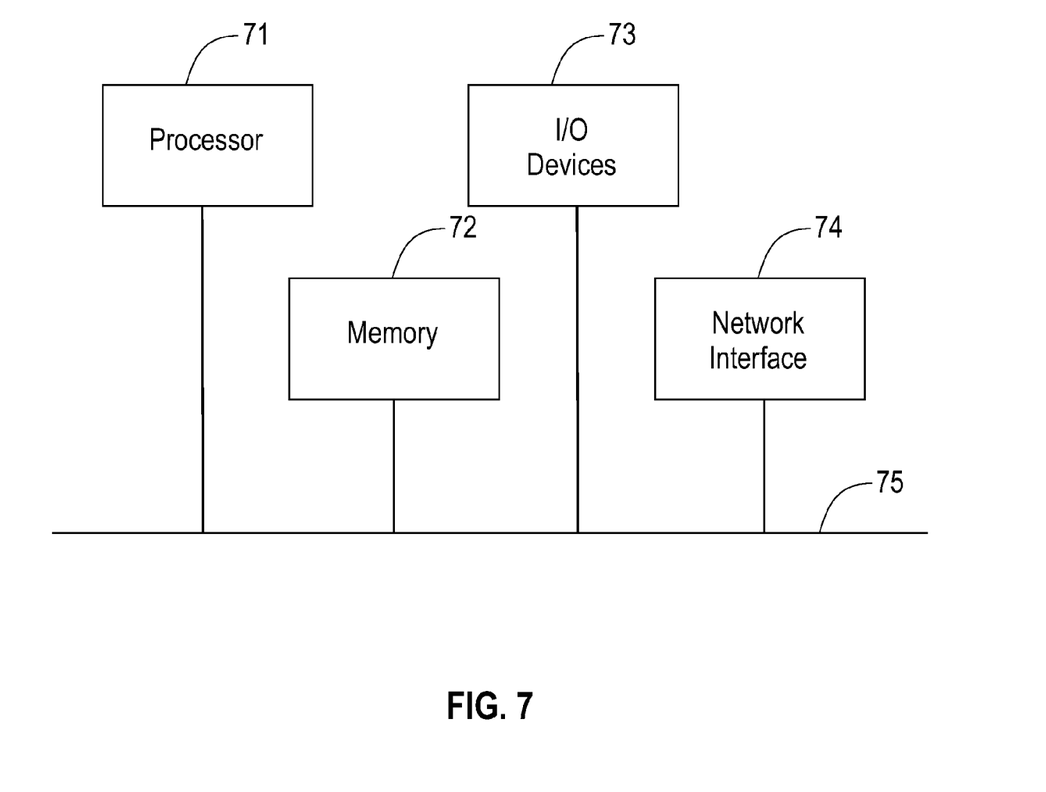
FIG. 7 depicts processor and memory components of a computing device within which principles of the invention may be implemented in accordance with an embodiment thereof.

Lastly, FIG. 7 depicts processor and memory components of a computing device within which principles of the invention may be implemented in accordance with an embodiment thereof. That is, FIG. 7 illustrates a computing device in accordance with which one or more components/steps of the automatic parameter determination techniques (e.g., components and methodologies described in the context of FIGS. 1 through 6) may be implemented, according to an embodiment of the present invention. It is to be understood that the individual components/steps may be implemented on one such computing devices or on more than one such computing device. In the case of an implementation on a distributed computing system, the individual computer devices may be connected via a suitable network, e.g., the Internet or World Wide Web. However, the system may be realized via private or local networks. In any case, the invention is not limited to any particular network.

Thus, the computing device shown in FIG. 7 may represent one or more servers or one or more other processing devices capable of providing all or portions of the functions described herein. For example, one or more of parameters 10, applications 11, evaluator 12, parambest 13 and/or nodes 21 may be implemented (e.g., stored and/or executed) on the computing device of FIG. 7.

As shown, the computing system architecture may include a processor 71, a memory 72, I/O devices 73, and a network interface 74, coupled via a computer bus 75 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a computing system whose behavior is affected by at least one parameter, a method for improving behavior of the computing system, comprising the steps of:

providing an application which executes on the computing system;

invoking the application a plurality of times using different values for at least one parameter to determine how system behavior varies as a function of the at least one parameter, wherein the at least one parameter is a system parameter whose value affects the performance of a plurality of applications executing on the computing system;

estimating a system overhead resulting from invoking the application;

estimating a system behavior improvement resulting from optimizing the at least one parameter based on invoking the application; and selecting a frequency for invoking the application to optimize the at least one parameter, wherein the frequency is selected based on the system overhead incurred by invoking the application and the system behavior improvement obtained from optimizing the at least one parameter.

2. The method of claim 1 further comprising the step of invoking the application with the frequency to modify the at least one parameter in order to improve the system behavior.

3. The method of claim 1 wherein the system behavior comprises at least one of performance, availability, minimization of exposure to lost data, accuracy, and consistency.

4. The method of claim 1 further comprising the step of modifying the frequency based on a change in workload.

5. The method of claim 1 wherein the system behavior comprises performance and the selecting step comprises selecting the frequency based on a difference of the system behavior improvement and the overhead.

6. The method of claim 5 wherein the selecting step comprises selecting the frequency that maximizes a difference of the system behavior improvement and the overhead.

7. The method of claim 1 further comprising the steps of:
identifying at least one invocation of an application which might change application state; and
preserving at least one original value of the application state using one of checkpointing and copy-on-write.

8. In a computing system whose behavior is affected by at least one parameter, a method for improving system behavior of the computing system, comprising the steps of:
providing an application which executes on the computing system;
invoking the application a plurality of times using different values for at least one parameter to determine how system behavior varies as a function of the at least one parameter, wherein the at least one parameter is a system parameter whose value affects the performance of a plurality of applications executing on the computing system;
estimating a system overhead resulting from invoking the application;
estimating a system behavior improvement resulting from optimizing the at least one parameter based on invoking the application; and
selecting a frequency for invoking the application to optimize the at least one parameter, wherein the frequency is selected based on the system overhead for invoking the application, an expected improvement in the system behavior from invoking the application, a proportion of total system workload consumed by the application, and a proportion of total system behavior which the application results in.

9. The method of claim 8 further comprising the step of invoking the application with the frequency to modify the at least one parameter in order to improve the system behavior.

10. In a computing system whose behavior is affected by at least one parameter, a method for determining behavior of the computing system, the method comprising:
providing a plurality of applications which execute on the computing system;
maintaining information correlating the behavior of at least two applications of the plurality of applications as a function of at least one parameter, wherein the at least one parameter is a system parameter whose value affects the performance of the plurality of applications executing on the computing system;
assigning the plurality of applications into at least one set wherein two applications belong to a same set if their behavior as a function of the at least one parameter is similar;
invoking a subset of the plurality of applications a plurality of times using different values of the at least one parameter to determine how system behavior varies as a function of the at least one parameter, wherein invoking the subset of the plurality of applications is performed by giving preference to applications belonging to different members of the at least one set;
estimating a system overhead resulting from invoking the subset of the plurality of applications;
estimating a system behavior improvement resulting from optimizing the at least one parameter based on invoking the subset of the plurality of applications; and
selecting a frequency for invoking the subset of the plurality of applications to optimize the at least one parameter, wherein the frequency is selected based on the system overhead incurred by invoking the subset of the plurality of applications and the system behavior improvement obtained from optimizing the at least one parameter.

11. The method of claim 10 wherein a single representative application from each set of the at least one set is invoked which is determined to contribute to more of an aggregate behavior of the system than other applications belonging to the same set.

12. In a computing system whose behavior is affected by at least one parameter, a method for improving behavior of the computing system, comprising the steps of:
providing an application which executes on the computing system;
invoking the application a plurality of times using different values for at least one parameter to determine how system behavior varies as a function of the at least one parameter, wherein the at least one parameter is a system parameter whose value affects the performance of a plurality of applications executing on the computing system;
providing a first function for estimating a cost which includes a system overhead resulting from invoking the application, wherein the cost is dependent on a frequency of invoking the application;
providing a second function for estimating system performance improvement resulting from modifying the at least one parameter based on invoking the application with said frequency; and
selecting a frequency for invoking the application based on a difference of the second function and the first function.

13. The method of claim 12 wherein the first function is a constant multiplied by the frequency.

14. In a computing system whose behavior is affected by at least one parameter, an apparatus for improving behavior of the computing system, the apparatus comprising:
a memory; and
a processor coupled to the memory and operative to:
provide an application which executes on the computing system;
invoke the application a plurality of times using different values for at least one parameter to determine how system behavior varies as a function of the at least one parameter, wherein the at least one parameter is a system parameter whose value affects the performance of a plurality of applications executing on the computing system;

estimate a system overhead resulting from invoking the application;

estimate a system behavior improvement resulting from optimizing the at least one parameter based on invoking the application; and select a frequency for invoking the application to optimize the at least one parameter, wherein the frequency is selected based on the system overhead incurred by invoking the application and the system behavior improvement obtained from optimizing the at least one parameter.

15. The apparatus of claim 14 wherein the processor is further operative to invoke the application with the frequency to modify the at least one parameter in order to improve the system behavior.

16. The apparatus of claim 14 wherein the system behavior comprises at least one of performance, availability, minimization of exposure to lost data, accuracy, and consistency.

17. The apparatus of claim 14 wherein the processor is further operative to modify the frequency based on a change in workload.

18. The apparatus of claim 14 wherein the system behavior comprises performance and the selecting operation comprises selecting the frequency based on a difference of the system behavior improvement and the overhead.

19. In a computing system whose behavior is affected by at least one parameter, an article of manufacture comprising a non-transitory computer readable storage medium containing one or more computer programs which when executed implement method steps for improving behavior of the computing system, the method steps comprising:

providing an application which executes on the computing system;

invoking the application a plurality of times using different values for at least one parameter to determine how system behavior varies as a function of the at least one parameter, wherein the at least one parameter is a system parameter whose value affects the performance of a plurality of applications executing on the computing system;

estimating a system overhead resulting from invoking the application;

estimating a system behavior improvement resulting from optimizing the at least one parameter based on invoking the application; and selecting a frequency for invoking the application to optimize the at least one parameter, wherein the frequency is selected based on the system overhead incurred by invoking the application and the system behavior improvement obtained from optimizing the at least one parameter.

20. The method of claim 10, wherein if at least two applications belong to a same set, preference is given to invoking an application consuming less overhead.

21. The method of claim 10, wherein if at least two applications belong to a same set, preference is given to invoking an application contributing more to an aggregate behavior of the entire computing system.

* * * * *